(12) United States Patent
Watanabe

(10) Patent No.: US 6,625,608 B1
(45) Date of Patent: Sep. 23, 2003

(54) METHOD AND APPARATUS FOR DISPLAYING NATURAL LANGUAGE STRUCTURE

(75) Inventor: Hideo Watanabe, Machida (JP)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 09/638,161

(22) Filed: Aug. 14, 2000

(30) Foreign Application Priority Data

Aug. 24, 1999 (JP) .......................................... 11-236551

(51) Int. Cl.[7] .............................. G06F 7/00; G06F 17/00
(52) U.S. Cl. ....................... 707/101; 707/100; 707/102; 707/104.1
(58) Field of Search .................... 704/1–10; 707/1–205; 715/526, 528

(56) References Cited

U.S. PATENT DOCUMENTS

| | | | | |
|---|---|---|---|---|
| 4,502,128 A | * | 2/1985 | Okajima et al. ............... | 704/8 |
| 4,586,160 A | * | 4/1986 | Amano et al. ............... | 434/156 |
| 4,791,587 A | * | 12/1988 | Doi ............................ | 434/157 |
| 4,821,230 A | * | 4/1989 | Kumano et al. ............... | 704/6 |
| 4,866,670 A | * | 9/1989 | Adachi et al. ................. | 704/3 |
| 4,954,984 A | * | 9/1990 | Kaijima et al. ................ | 704/2 |
| 5,091,876 A | * | 2/1992 | Kumano et al. ............ | 345/764 |
| 5,146,406 A | * | 9/1992 | Jensen ........................... | 704/9 |
| 5,418,717 A | * | 5/1995 | Su et al. ......................... | 704/9 |
| 5,424,947 A | * | 6/1995 | Nagao et al. .................. | 704/9 |
| 5,528,491 A | * | 6/1996 | Kuno et al. .................... | 704/2 |
| 5,678,051 A | * | 10/1997 | Aoyama ......................... | 704/2 |
| 5,721,938 A | * | 2/1998 | Stuckey ......................... | 704/4 |
| 5,761,631 A | * | 6/1998 | Nasukawa ...................... | 704/9 |
| 5,903,858 A | * | 5/1999 | Saraki ........................... | 704/4 |
| 5,960,384 A | * | 9/1999 | Brash ........................... | 704/10 |
| 5,966,686 A | * | 10/1999 | Heidorn et al. ................ | 704/9 |
| 6,278,967 B1 | * | 8/2001 | Akers et al. .................... | 704/2 |
| 6,285,978 B1 | * | 9/2001 | Bernth et al. .................. | 704/2 |
| 6,415,283 B1 | * | 7/2002 | Conklin ......................... | 707/3 |

FOREIGN PATENT DOCUMENTS

JP 06-274530 9/1994 ........... G06F/15/38

OTHER PUBLICATIONS

Tomek Strzalkowski, Jose Perez–Carballo, Mihnea Marinescu, "Natural Language Information Retrieval in Digital Libraries", 1996, ACM, Inc., pp. 117–125.*

Jim Cowie, Wendy Lehnert, "Information Extraction", Jan. 1996, vol. 39, No. 1, ACM, pp. 80–91.*

Douglas P. Metzler, Stephanie W. Haas, "The Constituent Object Parser: Syntactic Structure Matching for Information Retrieval", 1998, ACM Transactions on Information Systems, vol. 7, No. 3, Jul. 1998, pp. 292–316.*

PTS Learning System, "Word 97 Fundamentals", 1997, pp. 34–45, pp. 123–124.*

Lonnie E. Moseley, David M. Boodey, "Mastering Microsoft Office 97", Professional Edition, pp. 174–175.*

* cited by examiner

Primary Examiner—Greta Robinson
Assistant Examiner—Linh Black
(74) Attorney, Agent, or Firm—Thu Ann Dang

(57) ABSTRACT

A natural language structure display method for displaying, to represent a word relationship, the structure of a natural language sentence that is input, comprises the steps of: (1) parsing the natural language sentence that is input into predetermined elements; (2) analyzing the word relationships existing between the elements in accordance with the natural language grammar; and (3) displaying and positioning the predetermined elements so as to represent the word relationships obtained at the above step.

46 Claims, 13 Drawing Sheets

FIG. 16

IBMは

IBMは、
CPU用の半導体技術の
最新の成果を
発表した。

FIG. 18

IBM
announced
a new computer system for children
with voice function

*FIG. 19*

IBMは、
CPU用の半導体技術の
最新の成果を
発表した。

*FIG. 20*

IBM
announced
a new computer system for children
with voice function

*FIG. 21*

IBMは、
CPU用の 半導体技術の
最新の 成果を
発表した。

*FIG. 22*

IBM
announced
a new computer system for children
with voice function

FIG. 23

*IBMは、*
CPU用の*半導体技術の*
*最新の成果を*
*発表した。*

FIG. 24

IBM
announced
a new computer system for children
with voice function

FIG. 25

<u>*IBMは、*</u>
<u>CPU用の</u>*<u>半導体技術の</u>*
*<u>最新の成果を</u>*
*<u>発表した。</u>*

FIG. 26

<u>IBM</u>
<u>announced</u>
<u>a new computer system</u> for children
<u>with voice function</u>

FIG. 27
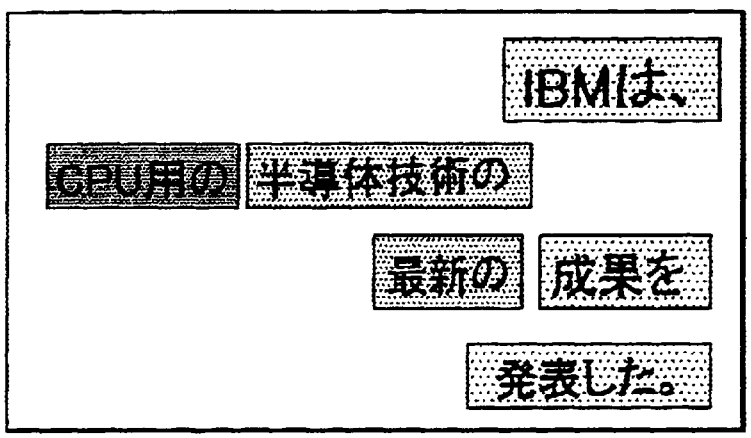
FIG. 28
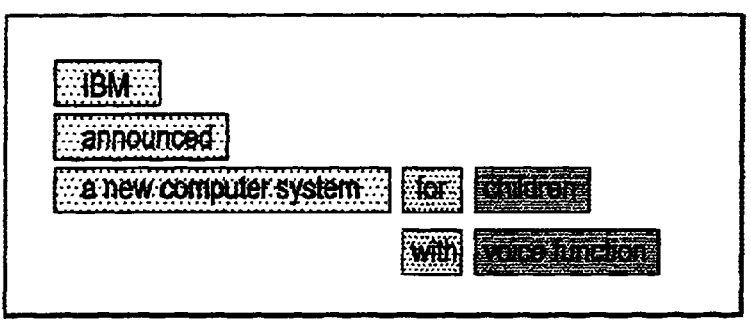
FIG. 29
(a) OVERALL DISPLAY
IBMは、
新しい半導体技術の成果を
発表した。
(b) OMISSION OF ONE LEVEL
IBMは、
+半導体技術の成果を
発表した
(c) OMISSION OF TWO LEVELS
IBMは、
+成果を
発表した。

*FIG. 30*

(a) OVERALL DISPLAY
```
IBM
announced
new ThinkPad with voice function
```

(b) OMISSION OF ONE LEVEL
```
IBM
announced
new ThinkPad with+
```

(c) OMISSION OF TWO LEVELS
```
IBM
announced
new ThinkPad+
```

*FIG. 31*

```
            IBMは

```
              IBMは、
CPU用の半導体技術の
        最新の成果を 発表した。
```

*FIG. 33*

```
IBM announced a new computer system for children
                               with voice function
```

US 6,625,608 B1

METHOD AND APPARATUS FOR DISPLAYING NATURAL LANGUAGE STRUCTURE

FIELD OF THE INVENTION

The present invention relates to methods and apparatus for displaying the structure of a natural language sentence that has been input.

BACKGROUND OF THE INVENTION

Conventionally, perfect analysis of the structure of a natural language is not possible in machine translation; the processing and the procedures required for this purpose are still not available. Thus, when machine translation is used, after the structure of a natural language sentence has been analyzed, the results provided by the analysis are displayed so that corrections can be made by a user.

The following problems, however, have arisen relative to the use of conventional displays for natural language structures. In conventional displays, lines and colors are employed to represent the relationships existing between words and phrases. But when lines are used in this manner to connect words and phrases, a user must trace the displayed lines in order to ascertain which grammatical elements are related. Under the circumstances, not only will a user find it difficult to trace a line to determine which words or which word and phrase it connects, but after tracing a line the user may find it difficult to understand how the grammatical elements are related. In addition, when the relationships existing between words and phrases are represented by the use of like colors for related elements, a user must search a display to ascertain for which elements the same colors are used, and again, the user may find it difficult to understand just how the grammatical elements are related.

SUMMARY OF THE INVENTION

To resolve these problems, it is one object of the present invention to provide methods and apparatus for displaying a natural language structure that can be easily understood by a user. To achieve this as well as other objects, the present invention provides various inventive methods and apparatus.

According to one aspect of the present invention, a method for displaying a natural language structure comprises the steps of: a) parsing a natural language sentence that is input to obtain predetermined grammatical elements; b) performing an analysis, based on a natural language grammar, of the relationships existing between the grammatical elements; and c) displaying and positioning the grammatical elements so as to demonstrate the relationships between them that was determined at the step b).

Since the individual grammatical elements of a natural language sentence are displayed to illustrate the relationships existing among the elements, the natural language structure can be easily identified.

In addition, according to one more aspect of the present invention, a method for displaying a natural language structure comprises the steps of: a) parsing a natural language sentence that is input to obtain predetermined grammatical elements; b) performing an analysis, based on a natural language grammar, of the relationships existing between the grammatical elements; c) vertically displaying and positioning, beginning at the top and continuing to the bottom, following the same order wherein they appeared in the natural language sentence, grammatical elements for which no relationships are established and those that are related to other, specified grammatical elements; d) displaying a source element for which the word relationship is the nearest word relationship for the elements displayed at the step c), in the same row as a destination element and following the same order wherein the elements appeared in the natural language sentence; e) inserting a new row immediately above a row whereon the destination element is displayed, when based on the natural language grammar, the word relationships existing between a source element and the elements displayed at the step c) are not the nearest, but instead, the source element is related to the order wherein the destination element appeared in the natural language sentence, so that the rear end of the source element is aligned with the front end of the destination element; f) inserting a new row immediately below a row in which the destination element is displayed, when based on the natural language grammar, the word relationships existing between the source element and the elements displayed at the step c) are not the nearest, but instead, are related to the inverted order wherein the destination element appeared in the natural language sentence, so that the front end of the source element is aligned with the rear end of the destination element; and g) repeating the steps d) to f) for elements for which the element displayed at the steps d) to f) is a destination.

According to another aspect of the present invention, a method for displaying a natural language structure comprises the steps of: a) parsing a natural language sentence that is input to obtain predetermined grammatical elements; b) performing an analysis, based on a natural language grammar, of the relationships existing between the grammatical elements; c) displaying an element that is not related to any other element; d) displaying a source element for which the word relationship is the nearest word relationship for the element displayed at the step c), in the same row as a destination element and following the same order wherein the elements appeared in the natural language sentence; e) inserting a new row immediately above a row whereon the destination element is displayed, when based on the natural language grammar, the word relationships existing between a source element and the element displayed at the step c) are not the nearest, but instead, the source element is related to the order wherein the destination element appeared in the natural language sentence, so that the rear end of the source element is aligned with the front end of the destination element; f) inserting a new row immediately below a row in which the destination element is displayed, when based on the natural language grammar, the word relationships existing between the source element and the element displayed at the step c) are not the nearest, but instead, are related to the inverted order wherein the destination element appeared in the natural language sentence, so that the front end of the source element is aligned with the rear end of the destination element; and g) repeating the steps d) to f) for elements for which the element displayed at the steps d) to f) is a destination.

According to an additional aspect of the present invention, a display attribute (e.g., highlighting, coloring, changing of a font, underlining, shading, etc.) is changed in accordance with a modification level (hereinafter the alteration of a display attribute and the display of the altered attribute is referred to as "highlighting").

According to a further aspect of the present invention, apparatus for displaying a natural language structure comprises: input means for entering a natural language sentence; parsing means for parsing the natural language sentence to obtain predetermined elements; analysis means for analyzing a relationship existing between the elements based on the natural language grammar; and display means for displaying and positioning the elements to represent the relationship ascertained by the analysis means.

According to yet one more aspect of the present invention, apparatus for displaying a natural language structure comprises: input means for entering a natural language sentence; parsing means for parsing a natural language sentence that is input to obtain predetermined grammatical elements; analysis means for performing an analysis, based on a natural language grammar, of the relationships existing between the grammatical elements; first display means for vertically displaying and positioning, beginning at the top and continuing to the bottom, following the same order wherein they appeared in the natural language sentence, grammatical elements for which no relationships are established and those that are related to other, specified grammatical elements; second display means for displaying a source element for which the word relationship is the nearest word relationship for the elements displayed by the first display means, in the same row as a destination element and following the same order wherein the elements appeared in the natural language sentence; third display means for inserting a new row immediately above a row whereon the destination element is displayed, when based on the natural language grammar, the word relationships existing between a source element and the elements displayed by the first display means are not the nearest, but instead, the source element is related to the order wherein the destination element appeared in the natural language sentence, so that the rear end of the source element is aligned with the front end of the destination element; fourth display means for inserting a new row immediately below a row in which the destination element is displayed, when based on the natural language grammar, the word relationships existing between the source element and the elements displayed by the first display means are not the nearest, but instead, are related to the inverted order wherein the destination element appeared in the natural language sentence, so that the front end of the source element is aligned with the rear end of the destination element; and repeating means for repetitively employing the second to the fourth display means for elements for which the elements displayed by the second to the fourth display means are relationship destinations.

According to yet another aspect of the present invention, apparatus for displaying a natural language structure comprises: input means for entering a natural language sentence; parsing means for parsing a natural language sentence that is input to obtain predetermined grammatical elements; analysis means for performing an analysis, based on a natural language grammar, of the relationships existing between the grammatical elements; first display means for displaying an element that is not related to any other element; second display means for displaying a source element for which the word relationship is the nearest word relationship for the element displayed by the first display means, in the same row as a destination element and following the same order wherein the elements appeared in the natural language sentence; third display means for inserting a new row immediately above a row whereon the destination element is displayed, when based on the natural language grammar, the word relationships existing between a source element and the element displayed by the first display means are not the nearest, but instead, the source element is related to the order wherein the destination element appeared in the natural language sentence, so that the rear end of the source element is aligned with the front end of the destination element; fourth display means for inserting a new row immediately below a row in which the destination element is displayed, when based on the natural language grammar, the word relationships existing between the source element and the element displayed by the first display means are not the nearest, but instead, are related to the inverted order wherein the destination element appeared in the natural language sentence, so that the front end of the source element is aligned with the rear end of the destination element; and repeating means for repetitively employing the second to the fourth display means for elements for which the elements displayed by the second to the fourth display means are relationship destinations.

According to yet an additional aspect of the present invention, the apparatus further comprises highlighting means for highlighting the elements in accordance with the level of a modification.

The input means may be a mouse and a keyboard, the parsing means and the analysis means may be a CPU (Central Processing Unit), and the display means, or the first to the fourth display means, may be a CRT (Cathode Ray Tube), a liquid display, or a CRT interface.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 16 is a diagram showing a sentence displayed on the screen of the display device in FIG. 1;

FIG. 17 is a diagram showing a sentence displayed on the screen of the display device in FIG. 1;

FIG. 18 is a diagram showing a sentence displayed on the screen of the display device in FIG. 1;

FIG. 19 is a diagram showing a sentence displayed on the screen of the display device in FIG. 1;

FIG. 20 is a diagram showing a sentence displayed on the screen of the display device in FIG. 1;

FIG. 21 is a diagram showing a sentence displayed on the screen of the display device in FIG. 1;

FIG. 22 is a diagram showing a sentence displayed on the screen of the display device in FIG. 1;

FIG. 23 is a diagram showing a sentence displayed on the screen of the display device in FIG. 1;

FIG. 24 is a diagram showing a sentence displayed on the screen of the display device in FIG. 1;

FIG. 25 is a diagram showing a sentence displayed on the screen of the display device in FIG. 1;

FIG. 26 is a diagram showing a sentence displayed on the screen of the display device in FIG. 1;

FIG. 27 is a diagram showing a sentence displayed on the screen of the display device in FIG. 1;

FIG. 28 is a diagram showing a sentence displayed on the screen of the display device in FIG. 1;

FIGS. 29A to 29C are diagrams showing a sentence displayed on the screen of the display device in FIG. 1;

FIGS. 30A to 30C are diagrams showing a sentence displayed on the screen of the display device in FIG. 1;

FIG. 31 is a diagram showing a sentence displayed on the screen of the display device in FIG. 1;

FIG. 32 is a diagram showing a sentence displayed on the screen of the display device in FIG. 1; and FIG. 33 is a diagram showing a sentence displayed on the screen of the display device in FIG. 1.

DETAILED DESCRIPTION OF PREFERRED EMBODIMENTS

Preferred embodiments of the present invention will now be described while referring to FIGS. 1 to 33.

First Embodiment

Figure 1:
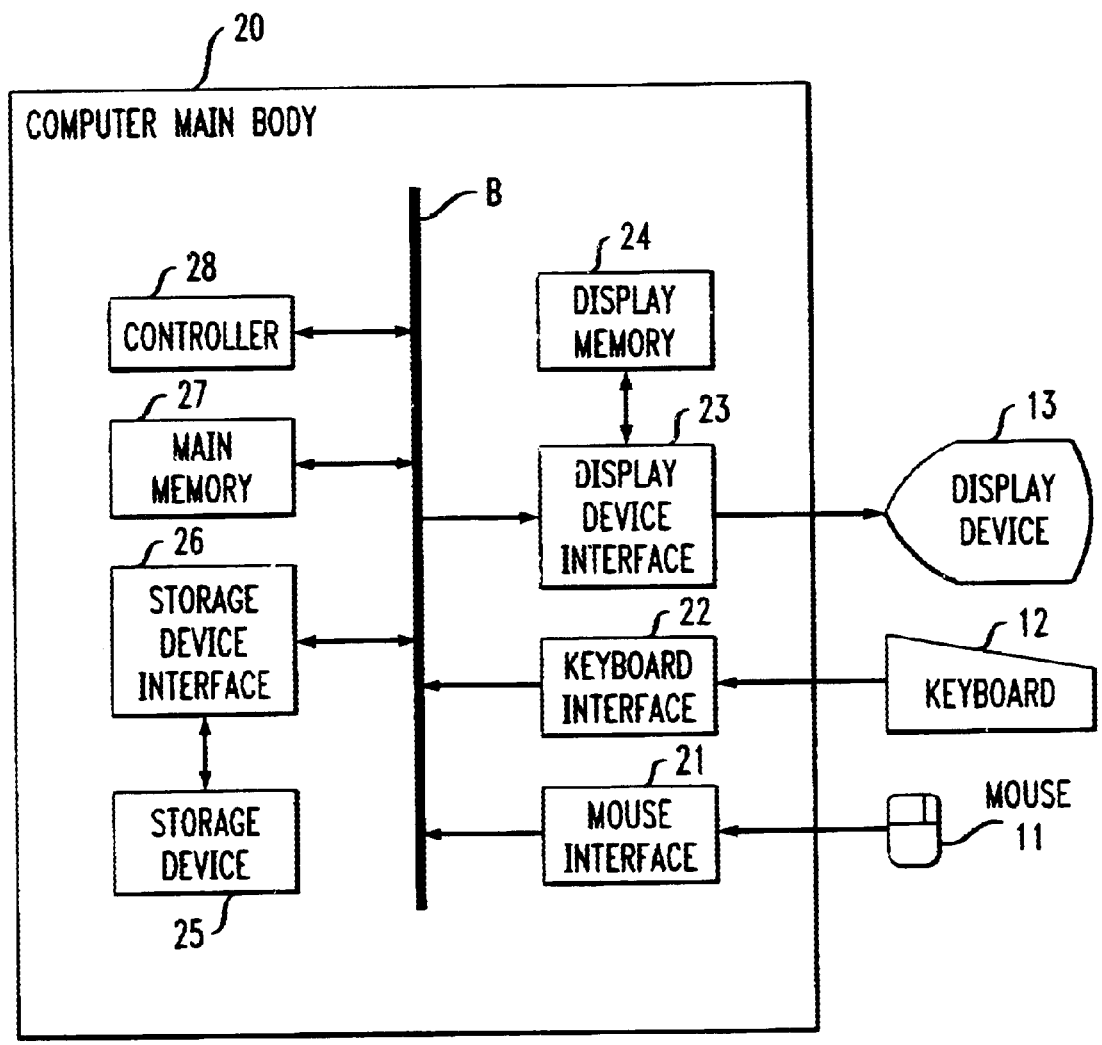
FIG. 1 is a block diagram illustrating the arrangement of a language structure display apparatus according to a first embodiment of the present invention.
Figure 2:
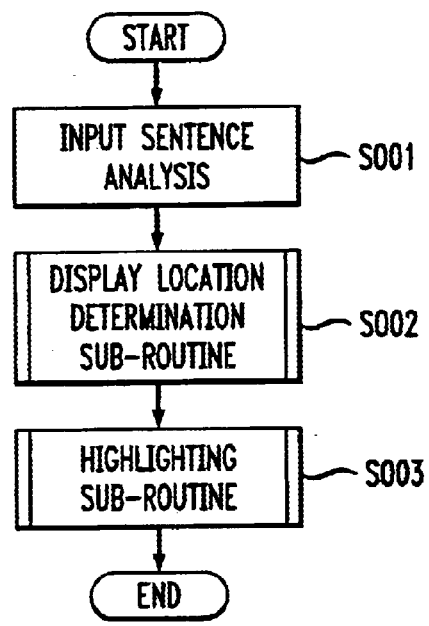
FIG. 2 is a flowchart showing the control processing performed by the controller in FIG. 1.

FIG. 1 is a diagram illustrating a language structure display apparatus 10 according to a first embodiment of the present invention. As is shown in FIG. 1, the language structure display apparatus 10 comprises a mouse 11, a keyboard 12, a display device 13 and a computer main body 20. The computer main body 20 comprises: a mouse interface 21, a keyboard interface 22, a display device interface 23, a display memory 24, a storage device interface 26, a main memory 27 and a controller 28, all of which are interconnected by a bus B; and a storage device 25, which is connected via the storage device interface 26 to the bus B. The mouse 11 is connected to the bus B via the mouse interface 21, the keyboard 12 is connected via the keyboard interface 22, and the display device 13 is connected via the display device interface 23.

The mouse 11 and the keyboard 12 are devices used by an operator to enter data. The mouse 11 and the keyboard 12 correspond to the input means.

The display device 13 is a device for displaying characters entered at the keyboard 12.

The computer main body 20 is a device for executing programs.

The mouse interface 21 is a device for receiving data entered by a user via the mouse 11 and for transmitting the data to the bus B.

The keyboard interface 22 is a device for receiving data entered by the user via the keyboard 12 and for transmitting the data to the bus B.

The display device interface 23 is a device for writing character and image data to the display memory 24, and for displaying, on the display device 13, an image based on the character or image data stored in the display memory 24.

The display memory 24 is constituted by a RAM (Random Access Memory) for storing character and image data to be displayed on the display device 13.

The storage device 25 is a hard disk drive for storing programs to be processed by the controller 28.

The storage device interface 26 is a device for writing data to and reading data from the storage device 25.

The main memory 27 is constituted by a RAM, work memory for the controller 28.

The controller 28, which is constituted by a CPU, transmits screen display instructions to the display device interface 23. The controller 28 also transmits instructions to the storage device interface 26 for writing data to and reading data from the storage device 25. Further, the controller 28 receives, via the mouse interface 21, data entered by the mouse 11, and receives, via the keyboard interface 21, data entered at the keyboard 12. In addition, the controller 28 processes character data entered by the mouse 11 and at the keyboard 12, and processes screen data to be displayed on the display device 13. The controller 28 corresponds to the parsing means and the analysis means, while together the controller 28, the display device interface 23, the display memory 24 and the display device 13 correspond to the display means, the first display means, the second display means, the third display means and the fourth display means.

Operation for the First Embodiment

An explanation will now be given, while referring to the flowcharts in FIGS. 2 to 14, for the control processing performed when the controller 28 executes a program stored in the storage device 25.

When instruction data to start the language structure display operation, and a sentence to be used for a language structure display have been entered using the mouse 11 or the keyboard 12, the controller 28 begins the control processing described in FIGS. 2 to 14.

At the first step, S001, the controller 28 analyzes the sentence that was input. That is, the controller 28 parses the sentence into predetermined syntactic elements which it then analyzes. Thereafter, the controller 28 regards the elements as nodes, and prepares a tree structure that diagrammatically represents the relationships existing between the nodes. The elements obtained by parsing the sentence may be either clauses, noun phrases or separate words, as needed. Further, depending on the language involved, different parsed elements may be employed, such as clauses for the Japanese language and noun phrases and words for the English language.

At step S002, the controller 28 executes a display location determination sub-routine to determine the positions whereat the display device interface 23 can display the individual nodes of the tree structure, which is produced at step S001, on the screen of the display device 13. The display location determination sub-routine at step S002 will be described in detail while referring to the flowcharts in FIGS. 3 to 7.

When the display location determination sub-routine is initiated, the controller 28 advances program control to step S004. At step S004, the controller 28 performs the initialization process. Specifically, the controller 28 vertically displays the root node and its child nodes in the same column, ranging from the top to the bottom of the screen of the display device 13, in the order in which they appear in a sentence. Further, the controller 28 adds all the child nodes of the root node to the parent node list.

At step S005, the controller 28 determines whether the parent node list is vacant. If the parent node list is vacant, the controller 28 shifts program control to step S022. If the parent node list is not vacant, program control is advanced to step S006 by controller 28.

When, at step S005, the parent node list is not vacant, at step S006 the controller 28 extracts the first node at the head of the parent node list, and defines it as the current parent node.

At step S007, the controller 28 defines, as the current row, the row on which the parent node is displayed on the screen of the display device 13.

At step S008, the controller 28 determines whether for the pertinent parent node there is a child node that has not yet been displayed on the screen of the display device 13. If there is such a child node, the controller 28 advances program control to step S009. Whereas if there is no such child node, the controller 28 shifts program control to step S014.

When, at step S008, there is a child node that has not yet been displayed, at step S009 the controller 28 defines, as "x," a child node that is positioned before and nearest the parent node in the word order in the sentence; and that has not yet been displayed on the screen of the display device 13.

At step S010, the controller 28 determines whether the current row matches the row on the screen of the display device 13 on which the parent node is displayed. If the current node matches the row whereon the parent node is displayed, the controller 28 advances program control to step S011. If the two rows do not match, the controller 28 shifts program control to step S013.

When, at step S010, the current row matches the row on which the parent node is displayed, at step S011 the controller 28 ascertains, based on the grammatical structure, whether the parent node is the nearest destination to which the node x is related. If the parent node is the nearest modification destination for the node x, the controller 28 advances program control to step S012. If the parent node is not the nearest modification destination, the controller 28 shifts program control to step S013.

When, at step S011, the parent node is the nearest modification destination for the node x, at step S012 the controller 28 displays the contents of the node x in the first position on the current row displayed on the screen of the display device 13. Program control is thereafter returned to step S008 by the controller 28.

When, at step S010, the row on which the parent node is displayed does not match the current row, or when, at step S011, the parent node is not the nearest modification destination for the node x, at step S013 the controller 28 prepares a new row immediately above the current row on the screen of the display device 13, and defines the new row as the current row. The controller 28 then displays the contents of the node x on the current row on the screen of the display device 13, so that the rear end of the node x is positioned at the column immediately before the front end of the parent node. The controller 28 thereafter shifts program control to step S008.

When, at step S008, no child node is available that has not yet been displayed, at step S014 the controller 28 defines, as the current row, the row along which the parent node is displayed on the screen of the display device 13.

At step S015, the controller 28 determines whether there is a child node of the pertinent parent that has not yet been displayed on the screen of the display device 13. If there is such a child node, the controller 28 advances program control to step S016. If no such child node is available, the controller 28 shifts program control to step S021.

When, at step S015, there is a child node that has not yet been displayed, at step S016 the controller 28 defines, as node x, a child node that is positioned after and nearest the parent node in the word order in the sentence, and that has not yet been displayed on the screen of the display device 13.

At step S017, the controller 28 determines whether the current row matches the row on the display screen on which the parent node is displayed. If the two rows match, the controller 28 advances program control to step S018. If the two rows do not match, the controller 28 shifts program control to step S020.

When, at step S017, the current row matches the row on which the parent node is displayed, at step S018 the controller 28 determines whether grammatically the parent node is the nearest modification destination for the node x. If the parent node is the nearest modification destination, the controller 28 advances program control to step S019. If the parent node is not the nearest, the controller 28 shifts program control to step S020. When, at step S018, the parent node is the nearest modification destination, at step S019 the controller 28 displays the contents of the node x in the last position on the current row on the screen of the display device 13. Program control is thereafter returned to step S015 by the controller 28.

When, at step S017, the current row does not match the row on which the parent node is displayed, or when, at step S018, the parent node is not the nearest modification destination, at step S020 the controller 28 creates a new row immediately below the current row on the screen of the display device 13, and defines the new row as the current row. The controller 28 then displays the contents of the node x on the current row on the screen of the display device 13, so that the front end of the node x is positioned at the column immediately following the rear end of the parent node. Program control is thereafter returned to step S015 by the controller 28.

When, at step S015, no more child nodes are available for display, at step S021 the controller 28 adds all the child nodes of the pertinent parent node to the parent node list. Program control is thereafter returned to step S005 by the controller 28.

When, at step S005, the parent node list is vacant, at step S022 the controller 28 displays, using different colors, the contents of the individual nodes on the rows on the screen of the display device 13. The controller 28 thereafter terminates the display location determination process at step S002, and advances program control to the highlighting process at step S003.

After the display location determination sub-routine at step S002 has been terminated, the controller 28 initiates the highlighting sub-routine at step S003. The highlighting sub-routine at step S003 will now be described in detail while referring to FIGS. 8 to 14. In the highlighting sub-routine at step S003, instruction data for designating the highlighted contents are received. When the highlighting sub-routine is begun, at step S023 the controller 28 sets to 0 the highlighting level of the root node in the tree structure that was prepared at step S001. Further, the controller 28 provides the highlighting level for all the nodes in the tree structure, so that the child nodes are positioned at one level higher than the parent node.

At step S024, the controller 28 determines whether the instruction data are highlighting data for changing the shades of character colors. If the instruction data are highlighting data for changing the shades of colors, the controller 28 shifts program control to step S030. If the instruction data are not such highlighting data, the controller 28 advances program control to step S025.

When, at step S024, the instruction data are highlighting data for changing the shades of character colors, at step S030 the controller 28 determines the shade of the color that is used at each highlighting level, so that for a node having a lower highlighting level the character color is darker.

At step S031, the controller 28 displays, on the screen of the display device 13, the contents of all the nodes in the tree structure in accordance with the shades that correspond to the highlighting levels of the nodes. Program control is thereafter returned to step S024 by the controller 28.

When, at step S024, the instruction data are not highlighting data for changing the shades of character colors, at step S025 the controller 28 determines whether the instruction data are highlighting data for changing the size of a font. If the instruction data are highlighting data for changing the size of a font, the controller 28 shifts program control to step S032. If the instruction data are not data for changing the size of a font, the controller 28 advances program control to step S026.

If, at step S025, the instruction data are highlighting data for changing the size of a font, at step S032 the controller 28 determines the size of a font for each highlighting level, so that for a node having a lower highlighting level the size of a font is greater.

At step S033, the controller 28 displays, on the screen of the display device 13, the contents of all the nodes in the tree structure in accordance with the sizes of the fonts that correspond to the highlighting levels. Program control is thereafter returned to step S024 by the controller 28.

When, at step S025, the instruction data are not highlighting data for changing the sizes of a font, at step S026 the controller 28 determines whether the instruction data are highlighting data for changing the weight and style of a font. If the instruction data are such data, the controller 28 shifts program control to step S034. If the instruction data are not data for changing the weight and the style of a font, the controller 28 advances program control to step S027.

When, at step S026, the instruction data are highlighting data for changing the weight and the style of a font, at step S034 the controller 28, using bold and italics, displays on the screen of the display device 13 the contents of a node having a highlighting level of 0.

At step S035, the controller 28, using italics, displays on the screen of the display device 13 the contents of a node having a highlighting level of 1. Program control is thereafter returned to step S024 by the controller 28.

When, at step S026, the instruction data are not highlighting data for changing the weight and style of a font, at step S027 the controller 28 determines whether the instruction data are highlighting data for using different line thicknesses to underline characters. If the instruction data are such data, the controller 28 shifts program control to step S036. If the instruction data are not data for underlining, the controller 28 shifts advances control to step S028.

When, at step S027, the instruction data are highlighting data for underlining characters using different line thicknesses, at step S036 the controller 28 determines the thickness to be used for an underline for each highlighting level.

At step S037, the controller 28 displays, on the screen of the display device 13, the contents of all the nodes in the tree structure for which the line thicknesses used for underlining correspond to the highlighting levels. Program control is thereafter returned to step S024 by the controller 28.

When, at step S027, the instruction data are not highlighting data for underlining characters using different line thicknesses, at step S028 the controller 28 determines whether the instruction data are highlighting data for the shading of characters. If the instruction data are data for the shading of characters, the controller 28 shifts program control to step S038. If the instruction data are not data for the shading of characters, the controller 28 advances program control to step S029.

When, at step S028, the instruction data are highlighting data for the shading of characters, at step S038 the controller 28 determines the density of the shading for each highlighting level.

At step S039, the controller 28 displays, on the screen of the display device 13, the contents of all the nodes in the tree structure for which shading is used in accordance with the highlighting levels. Program control is thereafter returned to step S024 by the controller 28.

When, at step S028, the instruction data are not highlighting data for shading the characters, at step S029 the controller 28 determines whether the instruction data are highlighting data for the omission of characters. If the instruction data are highlighting data for the omission of characters, the controller 28 shifts program control to step S040.

When, at step S029, it is determined the instruction data are highlighting data for the omission of characters, at step S040 the controller 28 defines, as "y," the maximum highlighting level for the nodes that are to be displayed on the screen of the display device 13.

At step S041, the controller 28 replaces a node having the highlighting level (y+1) with an ellipsis, and displays the ellipsis on the screen of the display device 13.

At step S042, the controller 28 deletes, from the screen of the display device 13, a node that has a highlighting level that is equal to or higher than (y+2). Program control is thereafter returned to step S024 by the controller 28.

When, at step S029, the instruction data are not highlighting data for the omission of characters, the controller 28 terminates the highlighting sub-routine.

When the highlighting sub-routine is terminated, the controller 28 ends the processing sequence.

Preparation of Tree Structure for the First Embodiment

An explanation will now be given, while referring to FIG. 15, of the preparation of a tree structure according to the first embodiment of the present invention.

Figure 15:
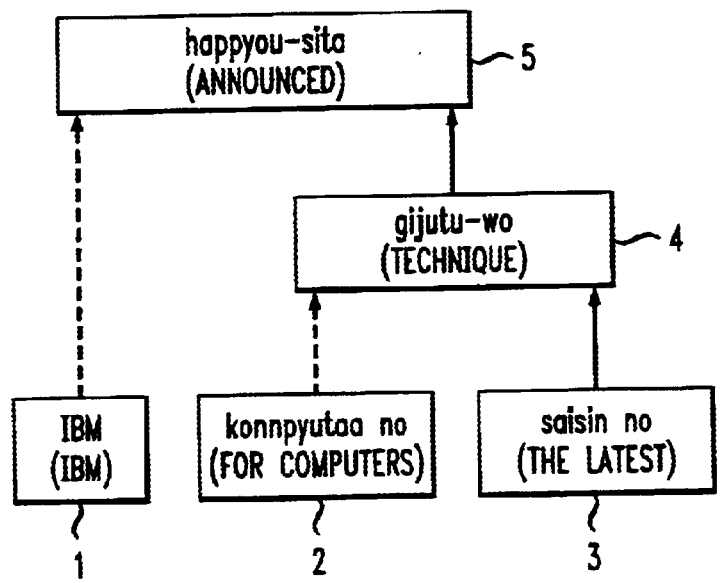
FIG. 15 is a diagram showing tree structure data prepared by a language structure display apparatus according to a first embodiment of the present invention.

FIG. 15 is a diagram showing an example tree structure that is created for the sentence, "IBM wa konnpyutaa no saisin no gijutu-wo happyou-sita (IBM announced the latest technique for computers)," by the input sentence analysis process at step S001. In this example, words and phrases are used as a node element; however, any level of phrases may be used instead. Further, elements may be varied depending on language involved, such as clausal units called "bunsetu" for the Japanese language.

In FIG. 15, node 5 ("happyou-sita" (announced)) is a root node, and node 1 ("IBM wa" (IBM)) and node 4 ("gijutu-wo" (technique)) are child nodes of the node 1. In addition, node 2 ("konnpyutaa no" (for computers)) and node 3 ("saisin no" (the latest)) are child nodes of the node 4.

In FIG. 15, solid lines represent the nearest word dependency relationship. That is, the node 5 (happyou-sita) has the node 4 (gijutu-wo) as the nearest modifier, and the node 4 (gijutu-wo) has the node 3 (saisin no) as the nearest modifier.

Broken lines represent a word dependency relationship other than the nearest. That is, the node 1 (IBM wa) and the node 5 (happyou-sita) do not have the nearest modifier, nor do the node 2 (konnpyutaa no) and the node 4 (gijutu-wo).

Example Display of a Language Structure for the First Embodiment

An explanation for the first embodiment will now be given, while referring to FIGS. 16 to 18, for an example display for a language structure.

FIG. 16 is a diagram showing the screen of the display device 13 whereon the nodes in the tree structure shown in FIG. 15 are displayed using the display location determination sub-routine at step S002.

FIG. 17 is a diagram showing the screen of the display device 13 wherein the sentence, "IBM wa CPU you no handoutai gijutu no saisin no seika-wo happyou-sita," is displayed by using for the input sentence analysis process at step S001 the display location determination sub-routine at step S002.

FIG. 18 is a diagram showing the screen of the display device 13 whereon the sentence "IBM announced a new computer system for children with a voice function" are displayed by using for the input sentence analysis process at step S001 the display location determination sub-routine at step S002.

Example Highlighting for the First Embodiment

An explanation will now be given while referring to FIGS. 19 to 29 of a highlighting example (based on the highlighting sub-routine at step S003) for the first embodiment of the present invention.

Highlighting by Using Shade of Fonts

FIG. 19 is a diagram showing the screen of the display device 13 whereon the data in FIG. 17 are highlighted by varying the shade of a font (based on the processes at steps S030 and S031). In this example, the node at the highlighting level of 0, i.e., the root node "happyou-sita," and nodes at the highlighting level of 1, i.e., "IBM wa" and "seika-wo," are displayed using the heaviest font. The nodes at the highlighting level of 2, i.e., "handoutai gijutu no" and "saisin no," are displayed using the second heaviest font. And the node at the highlighting level of 3, i.e., "CPU you no," is displayed using the lightest font.

FIG. 20 is a diagram showing the screen of the display device 13 wherein the data in FIG. 18 are highlighted by varying the shade of a font (based on the processes at steps S030 and S031). In this example, the nodes at the highlighting level of 0, i.e., the root node "IBM," and the nodes at the highlighting level of 1, i.e., "announced" and "a new computer system," are displayed using the heaviest font. The nodes at the highlighting level of 2, i.e., "for" and "with," are displayed using the second heaviest font. And the node at the highlighting level of 3, i.e., "children" and "voice function," are displayed using the lightest font.

Highlighting by Varying the Size of a Font

FIG. 21 is a diagram showing the screen of the display device 13 whereon the data in FIG. 17 are highlighted by varying the size of a font (based on the processes at steps S032 and S033). In this example, the node at the highlighting level of 0, i.e., the root node "happyou-sita," and nodes at the highlighting level of 1, i.e., "IBM wa" and "seika-wo," are displayed using the largest font. The nodes at the highlighting level of 2, i.e., "handoutai gijutu no" and "saisin no," are displayed using the second largest font. And the node at the highlighting level of 3, i.e., "CPU you no," is displayed using the smallest font.

FIG. 22 is a diagram showing the screen of the display device 13 whereon the data in FIG. 18 are highlighted by varying the size of a font (based on the processes at steps S032 and S033). In this example, the node at the highlighting level of 0, i.e., the root node "IBM," and the nodes at the highlighting level of 1, i.e., "announced" and "a new computer system," are displayed using the largest font. The nodes at the highlighting level of 2, i.e., "for" and "with," are displayed using the second largest font. And the nodes at the highlighting level of 3, i.e., "children" and "voice function," are displayed using the smallest font.

Highlighting in Accordance with the Weight and the Style of a Font

FIG. 23 is a diagram showing the screen of the display device 13 whereon the data in FIG. 17 are highlighted by changing the weight and the style of a font (based on the processes at steps S034 and S035). In this example, the nodes at the highlighting level of 0, i.e., the root node "happyou-sita," and nodes at the highlighting level of 1, i.e., "IBM wa" and "seika-wo," are displayed using bold and italics. The nodes at the highlighting level of 2, i.e., "handoutai gijutu no" and "saisin no," are displayed using italics. And the node at the highlighting level of 3, i.e., "CPU you no," is displayed using a normal font.

FIG. 24 is a diagram showing the screen of the display device 13 whereon the data in FIG. 18 are highlighted by changing the weight and style of a font (based on the processes at steps S034 and S035). In this example, the nodes at the a highlighting level of 0, i.e., the root node "IBM," and nodes at the highlighting level of 1, i.e., "announced" and "a new computer system," are displayed using bold and italics. The nodes at the highlighting level of 2, i.e., "for" and "with," are displayed using italics. And the nodes at the highlighting level of 3, i.e., "children" and "voice function," are displayed using a normal font.

Highlighting Using Underlining

FIG. 25 is a diagram showing the screen of the display device 13 whereon the data in FIG. 17 are highlighted using underlining (based on the processes at steps S036 and S037). In this example, the node at the highlighting level of 0, i.e., the root node "happyou-sita," and the nodes at the highlighting level of 1, i.e., "IBM wa" and "seika-wo," are displayed using the thickest underline. The nodes at the highlighting level of 2, i.e., "handoutai gijutu no" and "saisin no," are displayed using the second thickest underline. And the node at the highlighting level of 3, i.e., "CPU you no," is displayed using the thinnest underline.

FIG. 26 is a diagram showing the screen of the display device 13 whereon the data in FIG. 18 are highlighted using underlining (based on the processes at steps S036 and S037). In this example, the nodes at the highlighting level of 0, i.e., the root node "IBM," and the nodes at the highlighting level of 1, i.e., "announced" and "a new computer system," are displayed using the thickest underline. The nodes at the a highlighting level of 2, i.e., "for" and "with," are displayed using the second thickest underline. And the nodes at the highlighting level of 3, i.e., "children" and "voice function," are displayed using the thinnest underline.

Highlighting Using Shading

FIG. 27 is a diagram showing the screen of the display device 13 whereon the data in FIG. 17 are highlighted using shading (based on the processes at steps S038 and S039). In this example, the node at a highlighting level of 0, i.e., the root node "happyou-sita," and the nodes at a highlighting level of 1, i.e., "IBM wa" and "seika-wo," are displayed using the lightest shading. The nodes at the highlighting level of 2, i.e., "handoutai gijutu no" and "saisin no," are displayed using the second heaviest shading. And the node at the highlighting level of 3, i.e., "CPU you no," is displayed using the heaviest shading.

FIG. 28 is a diagram showing the screen of the display device 13 whereon the data in FIG. 18 are highlighted using shading (based on the processes at steps S038 and S039). In this example, the node at the highlighting level of 0, i.e., the root node "IBM," and the nodes at the highlighting level of 1, i.e., "announced" and "a new computer system," are displayed using the lightest shading. The nodes at the highlighting level of 2, i.e., "for" and "with," are displayed using the second heaviest shading. And the nodes at the highlighting level of 3, i.e., "children" and "voice function," are displayed using the heaviest shading.

Highlighting by Omitting

FIGS. 29A to 29C are diagrams showing example highlighting wherein a part of the sentence "IBM wa atarasii handoutai gijutu no seika-wo happyou-sita" is omitted (based on the processes at steps S040 to S042). It should be noted that the tree structure for this sentence is not shown.

In FIG. 29A, the entire sentence, "IBM wa atarasii handoutai gijutu no seika-wo happyou-sita," is shown. In FIG. 29B, "atarasii," the contents of the node at the highlighting level of 3, is omitted, and a symbol "+" is displayed instead of the omitted portion. In FIG. 29C, "handoutai gijutu no," the contents of the node at the highlighting level of 2, is also omitted.

FIGS. 30A to 30C are diagrams showing example highlighting wherein a part of the sentence "IBM announced new ThinkPad with voice function" is omitted (based on the processes at steps S040 to S042). It should be noted that the tree structure for this sentence is not shown.

In FIG. 30A, the entire sentence "IBM announced new ThinkPad with voice function" is shown. In FIG. 30B, "voice function," the contents of the node at the highlighting level of 3, is omitted and a symbol "+" is displayed instead. In FIG. 30C, "with," the contents of the node at the highlighting level of 2, is also omitted.

As is described above, according to the first embodiment, a user can easily identify the language structure.

Second Embodiment

Since the configuration of a language structure display system for a second embodiment is the same as that for the first embodiment in FIG. 1, no further explanation for it will be given.

Operations Performed for the Second Embodiment

Figure 3:
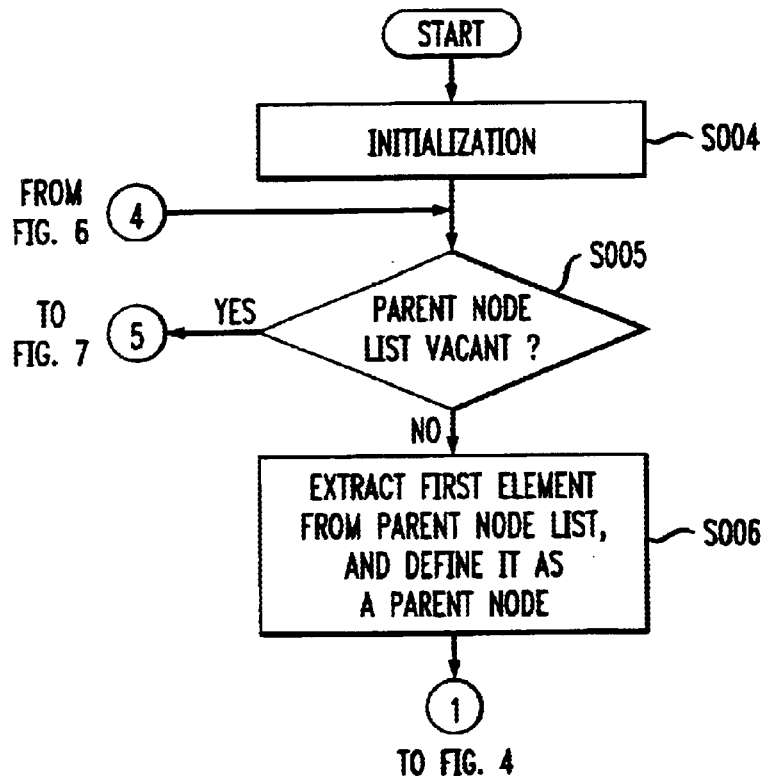
FIG. 3 is a flowchart showing the control processing performed by the controller in FIG. 1.
Figure 4:
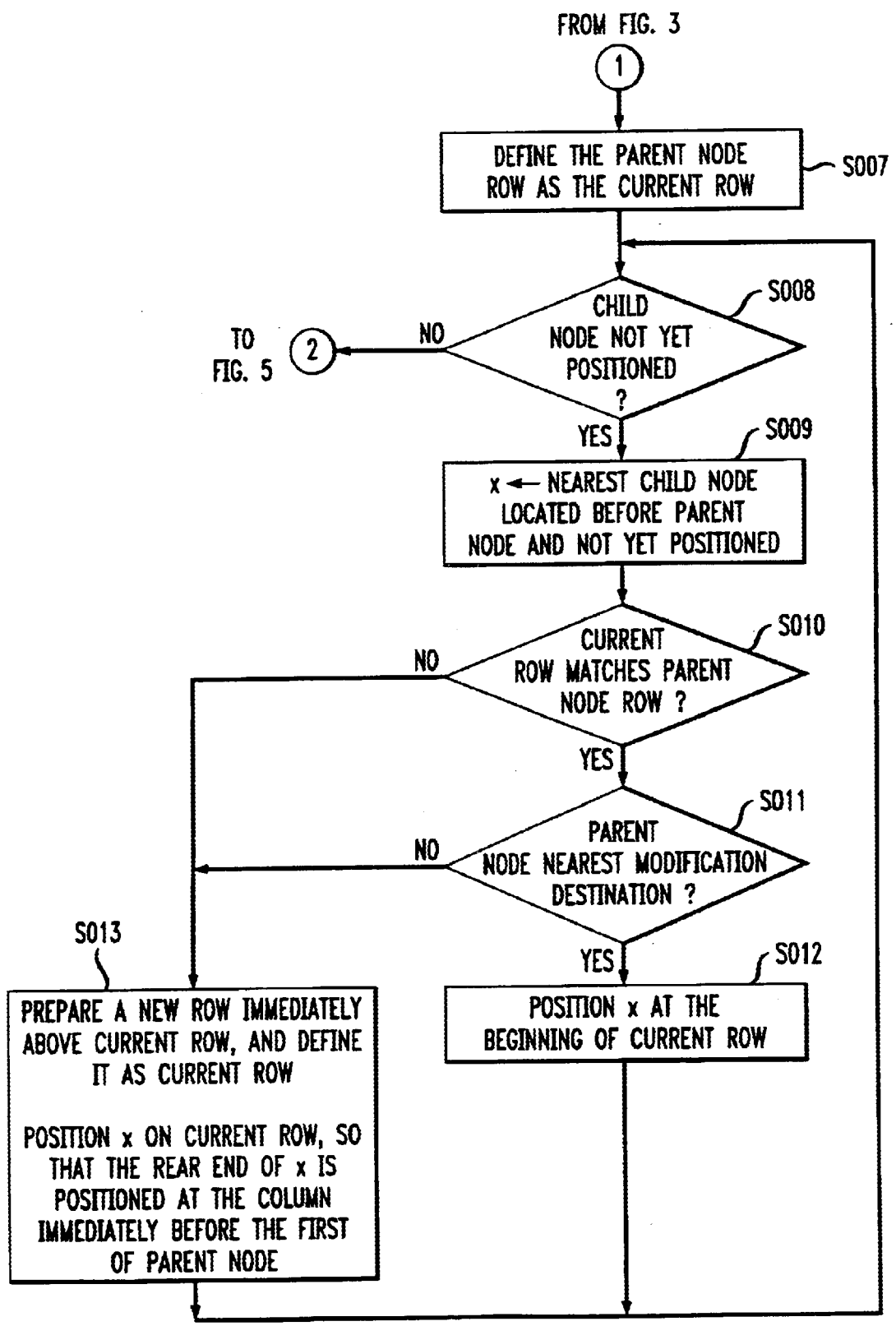
FIG. 4 is a flowchart showing the control processing performed by the controller in FIG. 1.
Figure 5:
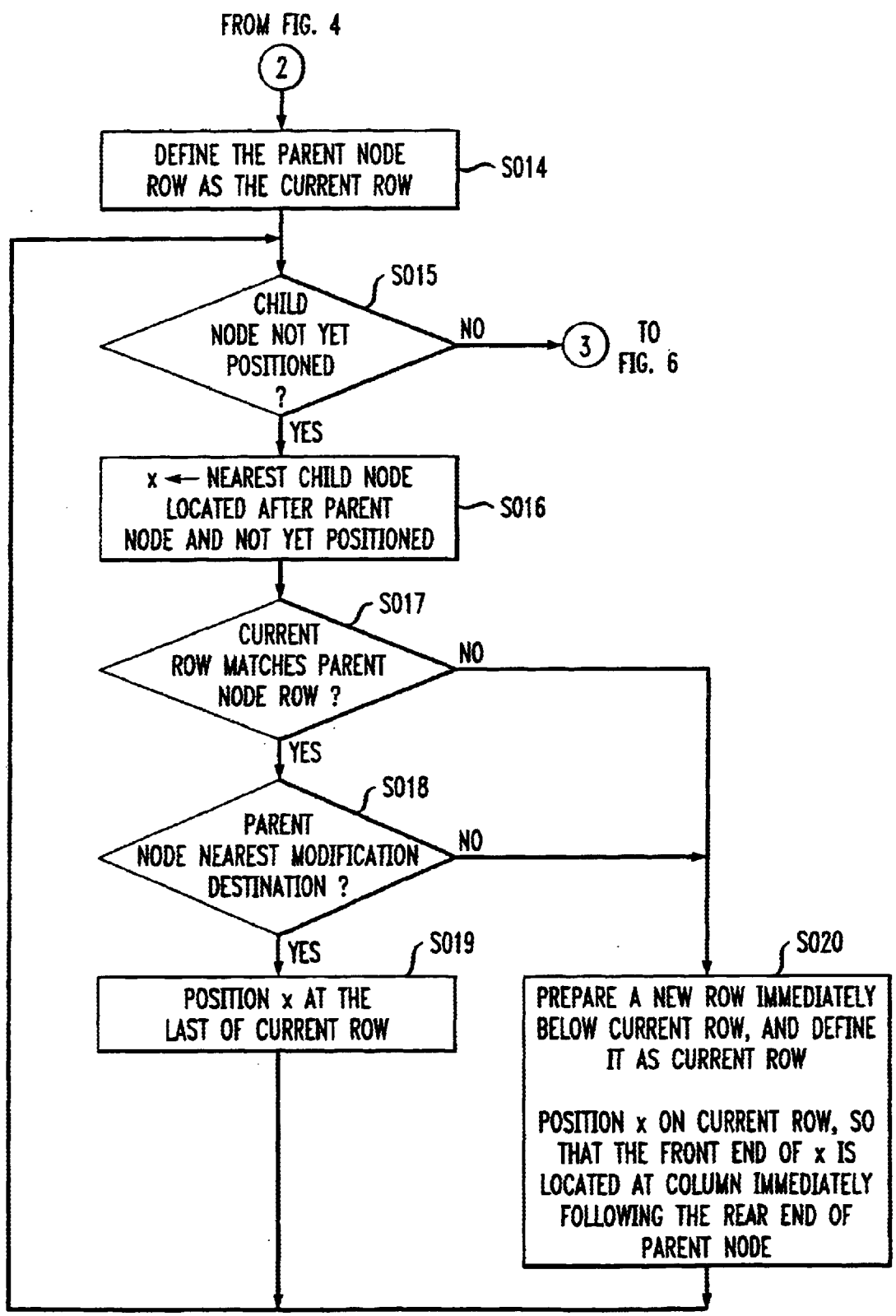
FIG. 5 is a flowchart showing the control processing performed by the controller in FIG. 1.
Figure 6:
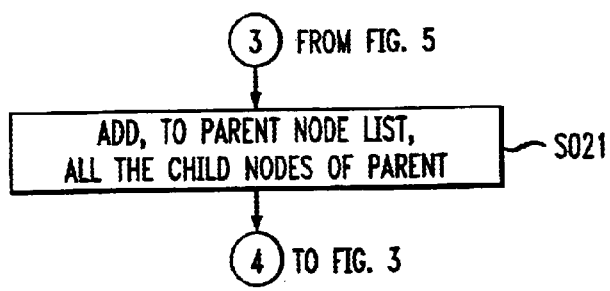
FIG. 6 is a flowchart showing the control processing performed by the controller in FIG. 1.
Figure 7:
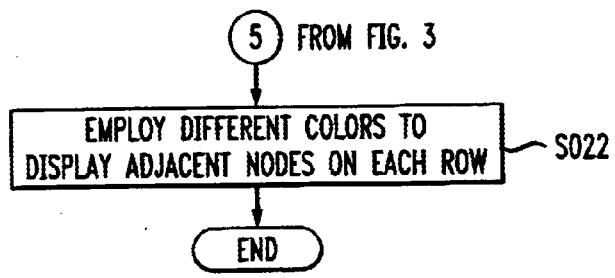
FIG. 7 is a flowchart showing the control processing performed by the controller in FIG. 1.
Figure 9:
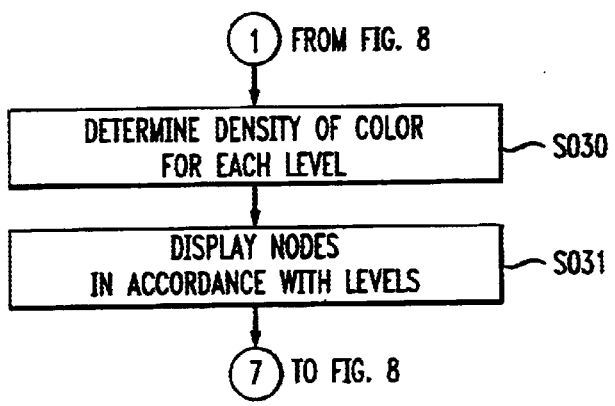
FIG. 9 is a flowchart showing the control processing performed by the controller in FIG. 1.
Figure 10:
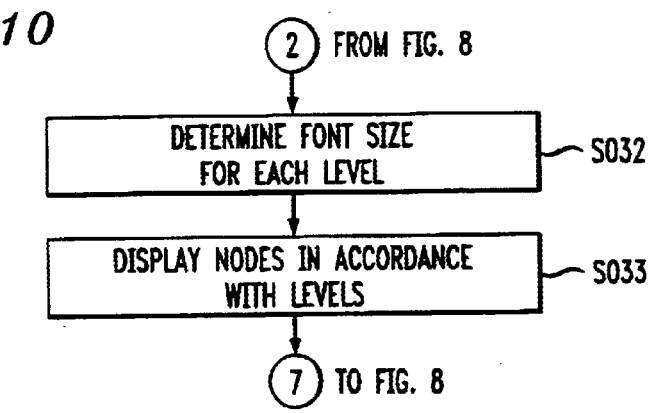
FIG. 10 is a flowchart showing the control processing performed by the controller in FIG. 1.
Figure 8:
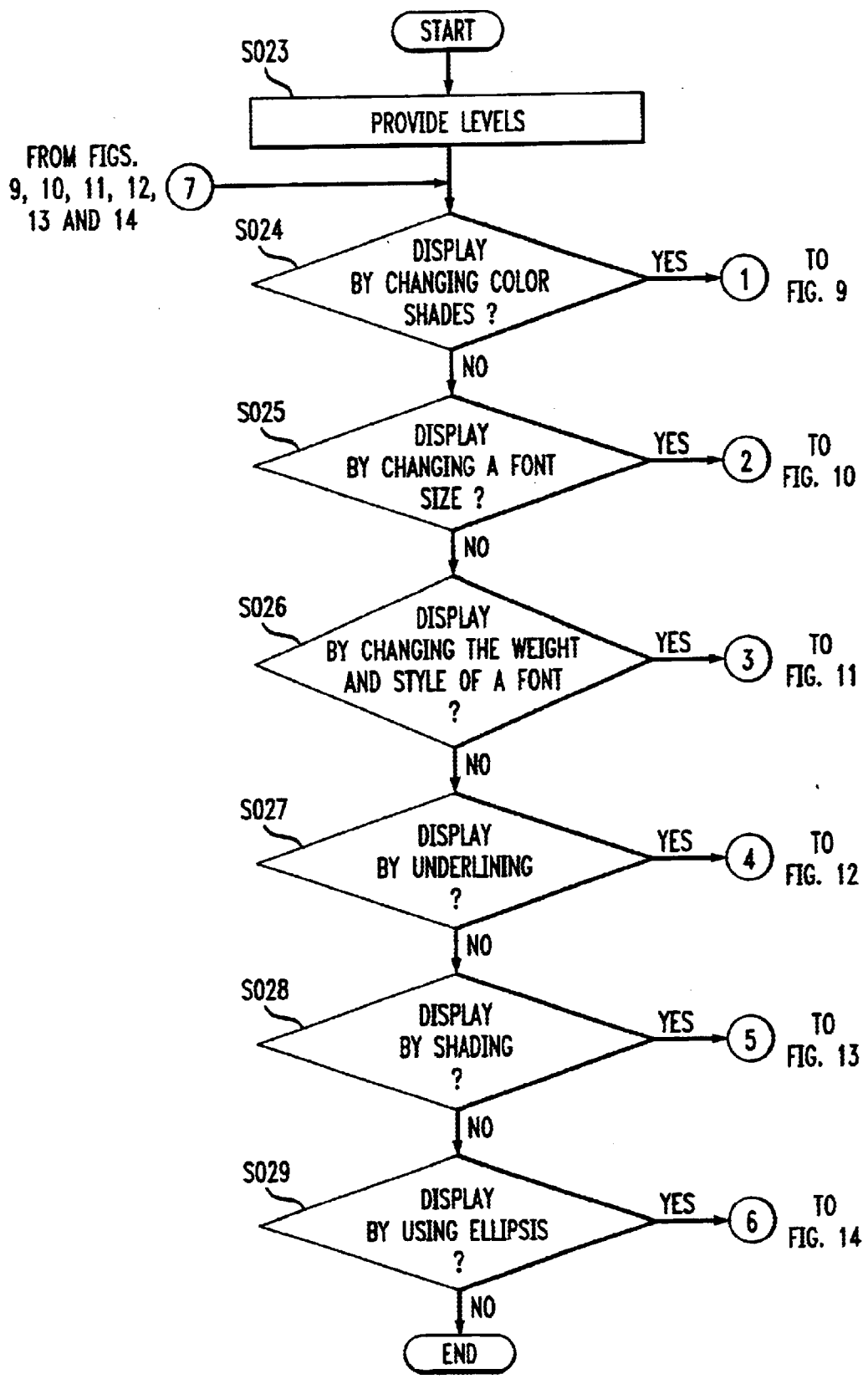
FIG. 8 is a flowchart showing the control processing performed by the controller in FIG. 1.
Figure 11:
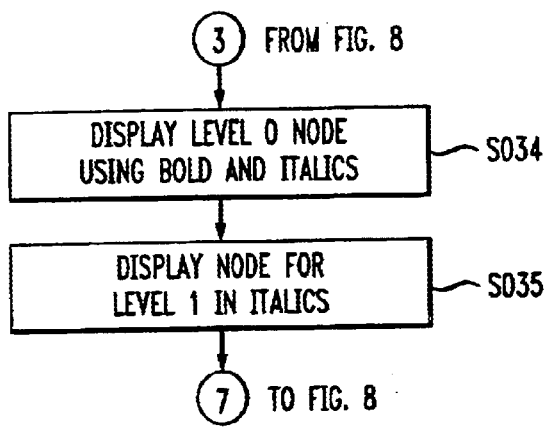
FIG. 11 is a flowchart showing the control processing performed by the controller in FIG. 1.
Figure 12:
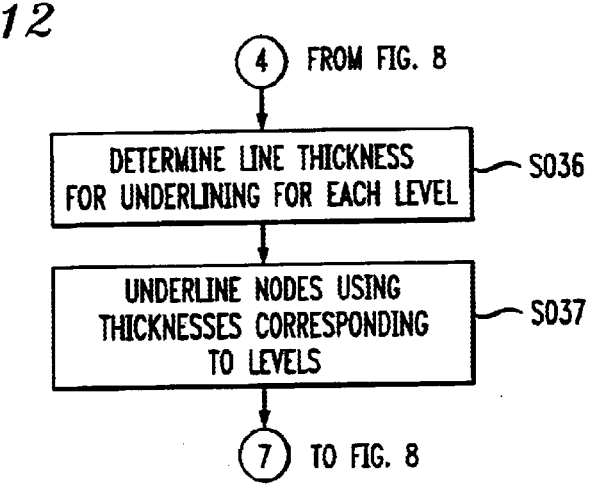
FIG. 12 is a flowchart showing the control processing performed by the controller in FIG. 1.
Figure 13:
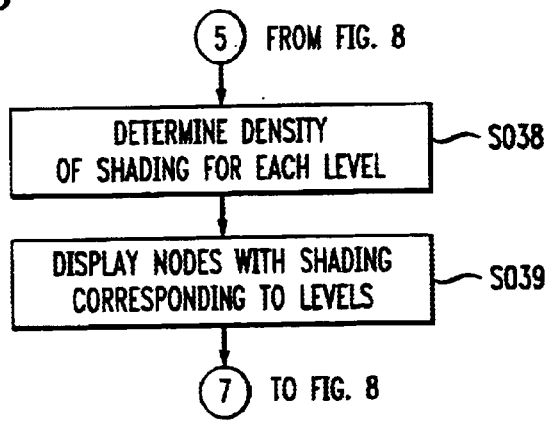
FIG. 13 is a flowchart showing the control processing performed by the controller in FIG. 1.
Figure 14:
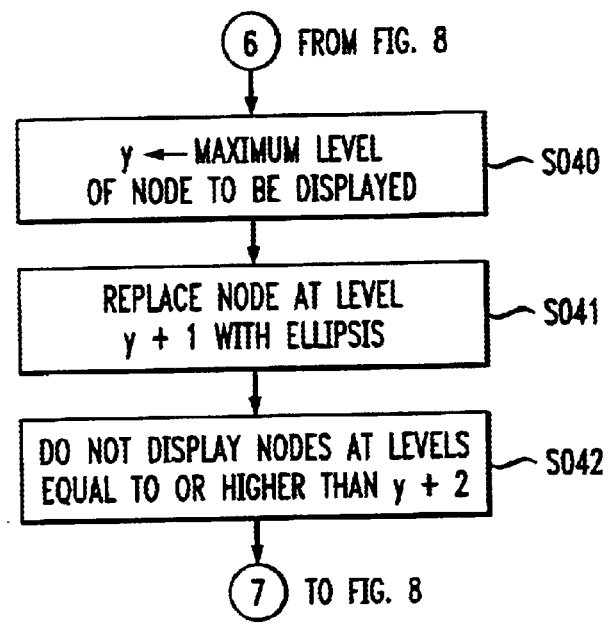
FIG. 14 is a flowchart showing the control processing performed by the controller in FIG. 1.

The operations performed for the second embodiment of the language structure display system are substantially the same as those performed for the first embodiment shown in FIGS. 2 to 14, with the exception of the process at step S004 in FIG. 3. Therefore, for the second embodiment of the language structure display system, only the process performed at step S004 will be explained.

At step S004, in the second embodiment of the language structure display system, the controller 28 displays, in an appropriate location on the screen of the display device 13, the root node in the tree structure that is prepared at step S001, and creates a parent node list that employs the root node as an element.

Since the subsequent operation is the same as that performed in the first embodiment of the language structure display system, no further explanation will be given.

Preparation of Tree Structure for the Second Embodiment

Since for the second embodiment the tree structure is prepared in the same manner as it was for the first embodiment, no further explanation will be given.

Example Display of a Language Structure for the Second Embodiment

A display of the a language structure used for the second embodiment will now be described while referring to FIGS. 31 to 33.

FIG. 31 is a diagram showing the screen of the display device 13 whereon the nodes of the tree structure in FIG. 15 are displayed by using the display location determination sub-routine at step S002.

FIG. 32 is a diagram showing the screen of the display device 13 whereon the sentence, "IBM wa CPU you no handoutai gijutu no saisin no seika-wo happyou-sita," is displayed using through the input sentence analysis process at step S001 and the display location determination sub-routine at step S002.

FIG. 33 is a diagram showing the screen of the display device 13 wherein the sentence "IBM announced a new computer system for children with voice function" is displayed using the input sentence analysis process at step S001 and the display location determination sub-routine at step S002.

Example Highlighting for the Second Embodiment

Since the highlighting for the second embodiment is performed in the same manner as it is in the first embodiment, no further explanation will be given.

Advantages of the Invention

Accordingly, as explained above, the present invention provides methods and apparatus for displaying the structure of a natural language sentence in order to represent word relationships, so that a user can easily identify and/or understand the language structure.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for displaying a natural language structure comprising the steps of:

a) parsing a natural language sentence that is input to obtain predetermined grammatical elements;

b) performing an analysis, based on a natural language grammar, of the relationships existing between the grammatical elements; and c) displaying and positioning said grammatical elements in accordance with tree structure-based levels and display attributes so as to visually demonstrate the relationships between said grammatical elements determined at said step b).

2. The natural language structure display method according to claim 1, wherein said elements are displayed by changing said display attribute in accordance with a modification level.

3. The natural language structure display method according to claim 2, wherein to display said elements by changing said display attribute is equivalent to displaying adjacent elements on the same line using the same or different colors.

4. The natural language structure display method according to claim 2, wherein to display said elements by changing said display attribute is equivalent to displaying characters using different color shades in accordance with said modification level.

5. The natural language structure display method according to claim 2, wherein to display said elements by changing said display attribute is equivalent to displaying characters having different font sizes in accordance with said modification level.

6. The natural language structure display method according to claim 2, wherein to display said elements by changing said display attribute is equivalent to displaying characters having different font types in accordance with said modification level.

7. The natural language structure display method according to claim 2, wherein to display said elements by changing said display attribute is equivalent to underlining characters having different thicknesses in accordance with said modification level.

8. The natural language structure display method according to claim 2, wherein to display said elements by changing said display attribute is equivalent to displaying characters having different shading in accordance with said modification level.

9. The natural language structure display method according to claim 2, wherein to display said elements by changing said display attribute is equivalent to omitting characters at a low modification level.

10. The natural language structure display method according to claim 2, wherein to display said elements by changing said display attribute is to display adjacent elements on the same line using the same or different colors, to display characters having different color shades in accordance with said modification level, to display characters having different font sizes in accordance with said modification level, to display characters having different font types in accordance with said modification level, to underline characters having different thicknesses in accordance with said modification level, to display characters having different shading in accordance with said modification level, and to omit characters at a low modification level.

11. A natural language structure display method comprising the steps of:

a) parsing a sentence into predetermined elements;

b) analyzing word relationships existing between said elements in accordance with a grammar of said natural language;

c) defining said elements as nodes, and connecting said nodes in accordance with said word relationships to generate tree structure data;

d) inserting and displaying root nodes and child nodes thereof in said tree structure data vertically, extending from the top to the bottom, following the order wherein said nodes appear in said natural language sentence;

e) adding, to a node list, said child nodes of said parent nodes displayed at said step d);

f) extracting one child node from the first location in said node list;

g) displaying said child node extracted at said step f), when according to said grammar of said natural language the relationship between said child node and said parent node is the nearest, in the same row as said parent node and following the same order wherein said parent node and said child node appear in the natural language sentence;

h) inserting a new row immediately above a row in which said parent node is displayed, when according to said natural language grammar the relationship between said child node extracted at said step f) and said parent node is not the nearest, and when said child node is related to the order wherein said parent node appears in said natural language sentence, and displaying said child node in said new row so that the rear end of said child node is aligned with the front end of said parent node;

i) inserting a new row immediately below a row in which said parent node is displayed, when according to said natural language grammar the relationship between said child node extracted at said step f) and said parent node is not the nearest and when said child node is related to the inverted order wherein said parent node appears in said natural language sentence, and displaying said child node in said new row so that the front end of said child node is aligned with the rear end of said parent node;

j) adding, to said node list, all the child nodes extracted at said step f); and k) repeating said steps f) to j) until said node list has been exhausted.

12. A natural language structure display method comprising the steps of:

a) parsing a sentence into predetermined elements;

b) analyzing word relationships existing between said elements in accordance with a grammar of said natural language;

c) defining said elements as nodes, and connecting said nodes in accordance with said word relationships to generate tree structure data;

d) displaying root nodes in said tree structure data;

e) adding, to a node list, said child nodes of said parent nodes displayed at said step d);

f) extracting one child node from the first location in said node list;

g) displaying said child node extracted at said step f), when according to said grammar of said natural language the relationship between said child node and said parent node is the nearest, in the same row as said parent node and following the same order wherein said parent node and said child node appear in the natural language sentence;

h) inserting a new row immediately above a row in which said parent node is displayed, when according to said natural language grammar the relationship between said child node extracted at said step f) and said parent node is not the nearest, and when said child node is related to the order wherein said parent node appears in said natural language sentence, and displaying said child node in said new row so that the rear end of said child node is aligned with the front end of said parent node;

i) inserting a new row immediately below a row in which said parent node is displayed, when according to said natural language grammar the relationship between said child node extracted at said step f) and said parent node is not the nearest and when said child node is related to the inverted order wherein said parent node appears in said natural language sentence, and displaying said child node in said new row so that the front end of said child node is aligned with the rear end of said parent node;

j) adding, to said node list, all the child nodes extracted at said step f); and k) repeating said steps f) to j) until said node list has been exhausted.

13. The natural language structure display method according to claim 12, wherein said elements are displayed by changing said display attribute in accordance with a modification level.

14. The natural language structure display method according to claim 13, wherein to display said elements by changing said display attribute is equivalent to displaying adjacent elements on the same line using the different colors.

15. The natural language structure display method according to claim 13, wherein to display said elements by changing said display attribute is equivalent to displaying characters using different color shades in accordance with said modification level.

16. The natural language structure display method according to claim 13, wherein to display said elements by changing said display attribute is equivalent to displaying characters having different font sizes in accordance with said modification level.

17. The natural language structure display method according to claim 13, wherein to display said elements by changing said display attribute is equivalent to displaying characters having different font types in accordance with said modification level.

18. The natural language structure display method according to claim 13, wherein to display said elements by changing said display attribute is equivalent to underlining characters having different thicknesses in accordance with said modification level.

19. The natural language structure display method according to claim 13, wherein to display said elements by changing said display attribute is equivalent to displaying characters having different shading in accordance with said modification level.

20. The natural language structure display method according to claim 13, wherein to display said elements by changing said display attribute is equivalent to omitting characters at a low modification level.

21. The natural language structure display method according to claim 13, wherein to display said elements by changing said display attribute is to display adjacent elements on the same line using the different colors, to display characters having different color shades in accordance with said modification level, to display characters having different font sizes in accordance with said modification level, to display characters having different font types in accordance with said modification level, to underline characters having different thicknesses in accordance with said modification level, to display characters having different shading in accordance with said modification level, and to omit characters at a low modification level.

22. An apparatus for displaying a natural language structure comprising:
   input means for entering a natural language sentence;
   parsing means for parsing said natural language sentence to obtain predetermined elements;
   analysis means for analyzing a relationship existing between said elements based on a natural language grammar; and
   display means for displaying and positioning said elements in accordance with tree structure-based levels and display attributes to visually represent said relationship between said elements ascertained by said analysis means.

23. The natural language structure display apparatus according to claim 22, further comprising highlighting means for displaying said elements by changing said display attribute in accordance with a modification level.

24. The natural language structure display apparatus according to claim 23, wherein said highlighting means displays adjacent elements on the same line using the different colors.

25. The natural language structure display apparatus according to claim 23, wherein said highlighting means displays characters using different color shades in accordance with said modification level.

26. The natural language structure display apparatus according to claim 23, wherein said highlighting means displays characters having different font sizes in accordance with said modification level.

27. The natural language structure display apparatus according to claim 23, wherein said highlighting means displays characters having different font types in accordance with said modification level.

28. The natural language structure display apparatus according to claim 23, wherein said highlighting means underlines characters having different thicknesses in accordance with said modification level.

29. The natural language structure display apparatus according to claim 23, wherein said highlighting means displays characters having different shading in accordance with said modification level.

30. The natural language structure display apparatus according to claim 23, wherein said highlighting means omits characters at a low modification level.

31. The natural language structure display apparatus according to claim 23, wherein said highlighting means displays adjacent elements on the same line using the different colors, displays characters having different color shades in accordance with said modification level, displays characters having different font sizes in accordance with said modification level, displays characters having different font types in accordance with said modification level, underlines characters having different thicknesses in accordance with said modification level, displays characters having different shading in accordance with said modification level, and omits characters at a low modification level.

32. A natural language structure display apparatus comprising:
   input means for entering a natural language sentence;
   parsing means for parsing a sentence into predetermined elements;
   analysis means for analyzing word relationships existing between said elements in accordance with a grammar of said natural language;
   tree structure data generation means for defining said elements as nodes, and for connecting said nodes in accordance with said word relationships to generate tree structure data;
   first display means for inserting and displaying root nodes and child nodes thereof in said tree structure data vertically, extending from the top to the bottom, following the order wherein said nodes appear in said natural language sentence;
   node list addition means for adding, to a node list, said child nodes of said parent nodes displayed by said first display means;
   node extraction means for extracting one child node from the first location in said node list;
   second display means for displaying said child node extracted by said node extraction means, when according to said grammar of said natural language the relationship between said child node and said parent node is the nearest, in the same row as said parent node and following the same order wherein said parent node and said child node appear in the natural language sentence;
   third display means for inserting a new row immediately above a row in which said parent node is displayed, when according to said natural language grammar the relationship between said child node extracted by said extraction means and said parent node is not the nearest, and when said child node is related to the order wherein said parent node appears in said natural language sentence, and for displaying said child node in said new row so that the rear end of said child node is aligned with the front end of said parent node;

fourth display means for inserting a new row immediately below a row in which said parent node is displayed, when according to said natural language grammar the relationship between said child node extracted by said extraction means and said parent node is not the nearest and when said child node is related to the inverted order wherein said parent node appears in said natural language sentence, and for displaying said child node in said new row so that the front end of said child node is aligned with the rear end of said parent node;

node list addition means for adding, to said node list, all the child nodes extracted by said extraction means; and repeating means for repeating said node extraction means, said second to fourth display means and said node list addition means until said node list has been exhausted.

33. A natural language structure display apparatus comprising:

input means for entering a natural language sentence;

parsing means for parsing a sentence into predetermined elements;

analysis means for analyzing word relationships existing between said elements in accordance with a grammar of said natural language;

tree structure data generation means for defining said elements as nodes, and for connecting said nodes in accordance with said word relationships to generate tree structure data;

first display means for displaying root nodes in said tree structure data;

node list addition means for adding, to a node list, said child nodes of said parent nodes displayed by said first display means;

node extraction means for extracting one child node from the first location in said node list;

second display means for displaying said child node extracted by said node extraction means, when according to said grammar of said natural language the relationship between said child node and said parent node is the nearest, in the same row as said parent node and following the same order wherein said parent node and said child node appear in the natural language sentence;

third display means for inserting a new row immediately above a row in which said parent node is displayed, when according to said natural language grammar the relationship between said child node extracted by said extraction means and said parent node is not the nearest, and when said child node is related to the order wherein said parent node appears in said natural language sentence, and for displaying said child node in said new row so that the rear end of said child node is aligned with the front end of said parent node;

fourth display means for inserting a new row immediately below a row in which said parent node is displayed, when according to said natural language grammar the relationship between said child node extracted by said extraction means and said parent node is not the nearest and when said child node is related to the inverted order wherein said parent node appears in said natural language sentence, and for displaying said child node in said new row so that the front end of said child node is aligned with the rear end of said parent node;

node list addition means for adding, to said node list, all the child nodes extracted by said extraction means; and repeating means for repeating said node extraction means, said second to fourth display means and said node list addition means until said node list has been exhausted.

34. The natural language structure display apparatus according to claim 33, further comprising highlighting means for highlighting said elements in accordance with a modification level.

35. The natural language structure display apparatus according to claim 34, wherein said highlighting means displays adjacent elements on the same line using the different colors.

36. The natural language structure display apparatus according to claim 34, wherein said highlighting means displays characters using different color shades in accordance with said modification level.

37. The natural language structure display apparatus according to claim 34, wherein said highlighting means displays characters having different font sizes in accordance with said modification level.

38. The natural language structure display apparatus according to claim 34, wherein said highlighting means displays characters having different font types in accordance with said modification level.

39. The natural language structure display apparatus according to claim 34, wherein said highlighting means underlines characters having different thicknesses in accordance with said modification level.

40. The natural language structure display apparatus according to claim 34, wherein said highlighting means displays characters having different shading in accordance with said modification level.

41. The natural language structure display apparatus according to claim 34, wherein said highlighting means omits characters at a low modification level.

42. The natural language structure display apparatus according to claim 34, wherein said highlighting means displays adjacent elements on the same line using the different colors, displays characters having different color shades in accordance with said modification level, displays characters having different font sizes in accordance with said modification level, displays characters having different font types in accordance with said modification level, underlines characters having different thicknesses in accordance with said modification level, displays characters having different shading in accordance with said modification level, and omits characters at a low modification level.

43. Apparatus for displaying a natural language structure comprising: at least one processor configured to perform the operations of:

a) parsing a natural language sentence that is input to obtain predetermined grammatical elements;

b) performing an analysis, based on a natural language grammar, of the relationships existing between the grammatical elements; and c) displaying and positioning said grammatical elements in accordance with tree structure-based levels and display attributes so as to visually demonstrate the relationships between said grammatical elements determined by said operation b).

44. A natural language structure display apparatus comprising:

at least one processor configured to perform the operations of:

a) parsing a sentence into predetermined elements;

b) analyzing word relationships existing between said elements in accordance with a grammar of said natural language;

c) defining said elements as nodes, and connecting said nodes in accordance with said word relationships to generate tree structure data;

d) inserting and displaying root nodes and child nodes thereof in said tree structure data vertically, extending from the top to the bottom, following the order wherein said nodes appear in said natural language sentence;

e) adding, to a node list, said child nodes of said parent nodes displayed at said step d);

f) extracting one child node from the first location in said node list;

g) displaying said child node extracted at said step f), when according to said grammar of said natural language the relationship between said child node and said parent node is the nearest, in the same row as said parent node and following the same order wherein said parent node and said child node appear in the natural language sentence;

h) inserting a new row immediately above a row in which said parent node is displayed, when according to said natural language grammar the relationship between said child node extracted at said step f) and said parent node is not the nearest, and when said child node is related to the order wherein said parent node appears in said natural language sentence, and displaying said child node in said new row so that the rear end of said child node is aligned with the front end of said parent node;

i) inserting a new row immediately below a row in which said parent node is displayed, when according to said natural language grammar the relationship between said child node extracted at said step f) and said parent node is not the nearest and when said child node is related to the inverted order wherein said parent node appears in said natural language sentence, and displaying said child node in said new row so that the front end of said child node is aligned with the rear end of said parent node;

j) adding, to said node list, all the child nodes extracted at said step f); and k) repeating said steps f) to j) until said node list has been exhausted.

45. A natural language structure display apparatus comprising:

at least one processor configured to perform the operations of:

a) parsing a sentence into predetermined elements;

b) analyzing word relationships existing between said elements in accordance with a grammar of said natural language;

c) defining said elements as nodes, and connecting said nodes in accordance with said word relationships to generate tree structure data;

d) displaying root nodes in said tree structure data;

e) adding, to a node list, said child nodes of said parent nodes displayed at said step d);

f) extracting one child node from the first location in said node list;

g) displaying said child node extracted at said step f), when according to said grammar of said natural language the relationship between said child node and said parent node is the nearest, in the same row as said parent node and following the same order wherein said parent node and said child node appear in the natural language sentence;

h) inserting a new row immediately above a row in which said parent node is displayed, when according to said natural language grammar the relationship between said child node extracted at said step f) and said parent node is not the nearest, and when said child node is related to the order wherein said parent node appears in said natural language sentence, and displaying said child node in said new row so that the rear end of said child node is aligned with the front end of said parent node;

i) inserting a new row immediately below a row in which said parent node is displayed, when according to said natural language grammar the relationship between said child node extracted at said step f) and said parent node is not the nearest and when said child node is related to the inverted order wherein said parent node appears in said natural language sentence, and displaying said child node in said new row so that the front end of said child node is aligned with the rear end of said parent node;

j) adding, to said node list, all the child nodes extracted at said step f); and k) repeating said steps f) to j) until said node list has been exhausted.

46. An article of manufacture for displaying a natural language structure, comprising a machine readable medium containing one or more programs which when executed implement the steps of:

a) parsing a natural language sentence that is input to obtain predetermined grammatical elements;

b) performing an analysis, based on a natural language grammar, of the relationships existing between the grammatical elements; and c) displaying and positioning said grammatical elements in accordance with tree structure based levels and display attributes so as to visually demonstrate the relationships between said grammatical elements determined at said step b).

* * * * *